United States Patent [19]

Iwerks et al.

[11] Patent Number: 5,581,313
[45] Date of Patent: Dec. 3, 1996

[54] REVERSING FILM PROJECTION SYSTEM

[75] Inventors: Donald W. Iwerks, Burbank; Robert H. Gurr, Tujunga, both of Calif.

[73] Assignee: Iwerks Entertainmnet, Burbank, Calif.

[21] Appl. No.: 488,870

[22] Filed: Jun. 9, 1995

[51] Int. Cl.⁶ .............. G03B 1/00; G03B 21/32; G03B 21/00
[52] U.S. Cl. .............. 352/125; 352/83; 352/123; 352/239
[58] Field of Search ............. 352/83, 125, 239, 352/123

[56] References Cited

U.S. PATENT DOCUMENTS

| 961,536 | 12/1908 | Roebuck | 352/125 |
| 1,112,270 | 9/1914 | Currie | 352/83 |
| 1,485,907 | 4/1921 | Brown | 352/239 |
| 1,801,061 | 1/1927 | Thornton | 352/125 |
| 3,471,223 | 5/1966 | Langone | 352/83 |
| 3,792,919 | 2/1974 | Holmes et al. | 352/72 |
| 3,937,567 | 2/1976 | Thomas et al. | 352/83 |
| 4,150,886 | 4/1979 | Merkel et al. | 352/166 |

FOREIGN PATENT DOCUMENTS

| 0191559A1 | 8/1986 | European Pat. Off. |
| 0230086A1 | 7/1987 | European Pat. Off. |
| 635841 | 3/1928 | France | 352/83 |
| 972021 | 1/1951 | France | 352/239 |
| 244071 | 3/1947 | Switzerland | 352/83 |
| 2164465 | 3/1986 | United Kingdom |
| 2170918 | 8/1986 | United Kingdom |

*Primary Examiner*—Safet Metjahic
*Assistant Examiner*—Michael Dalakis
*Attorney, Agent, or Firm*—Christie, Parker & Hale, LLP

[57] ABSTRACT

The reversing film projection system employs film having images printed substantially side-by-side to allow presentation of one set of images in a forward direction and the adjacent images in rearward direction by moving the projection head and associated aperture plate and film guide laterally with respect to the lens and lamp house for display of the film images. In a first forward drive position, the projector motor drives the film in a forward direction with a first aperture of the aperture plate and associated first set of film images aligned with the optical train. Upon completion of the image presentation in the forward direction, the projection head is displaced laterally aligning a second aperture in the aperture plate and the associated second set of film images with the optical train, with the projection motor engaged in a reversed direction. Actuators for motion of the projection head, dowser controls and film transport drive are microprocessor controlled employing absolute frame count for various film presentations.

15 Claims, 11 Drawing Sheets

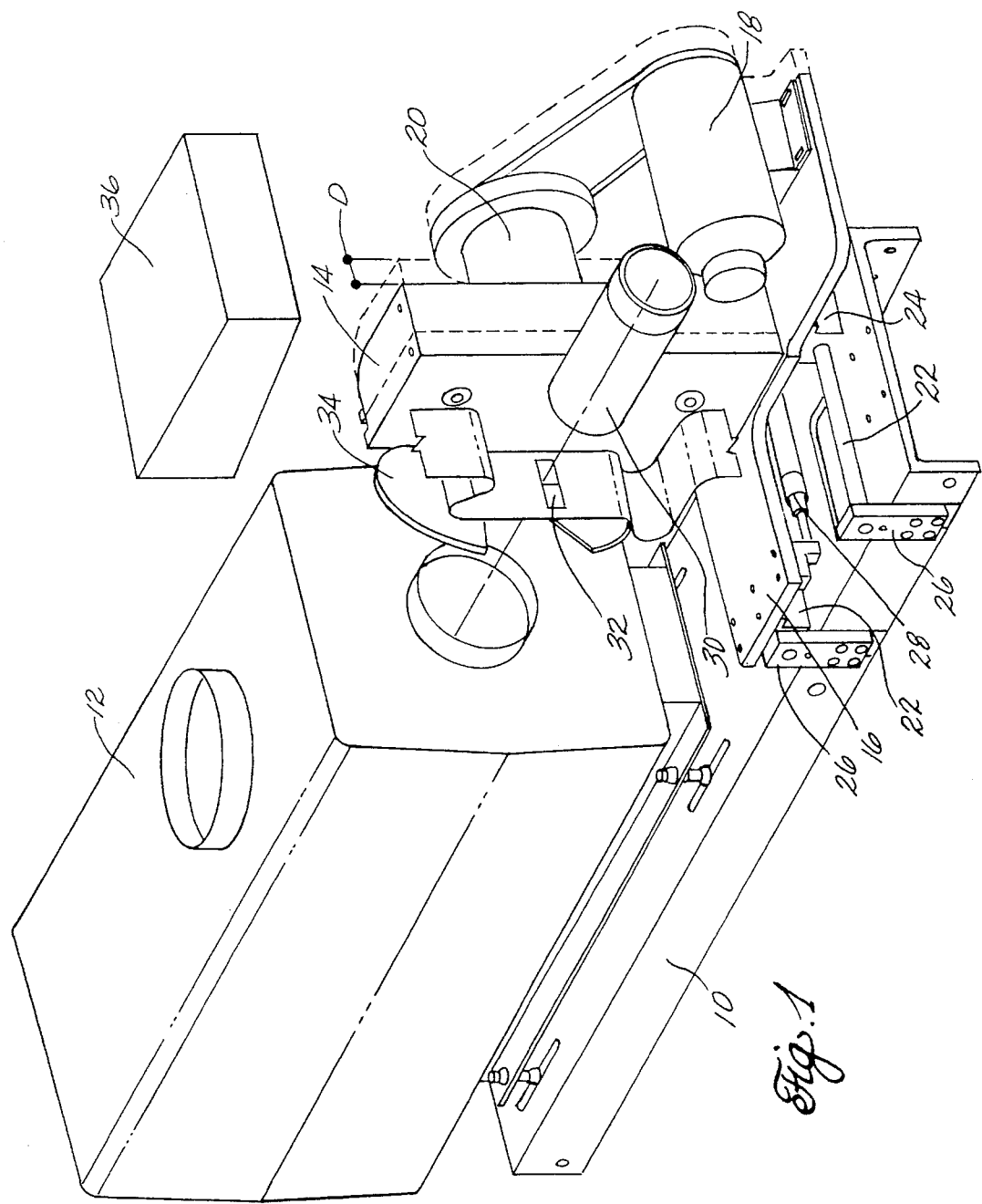

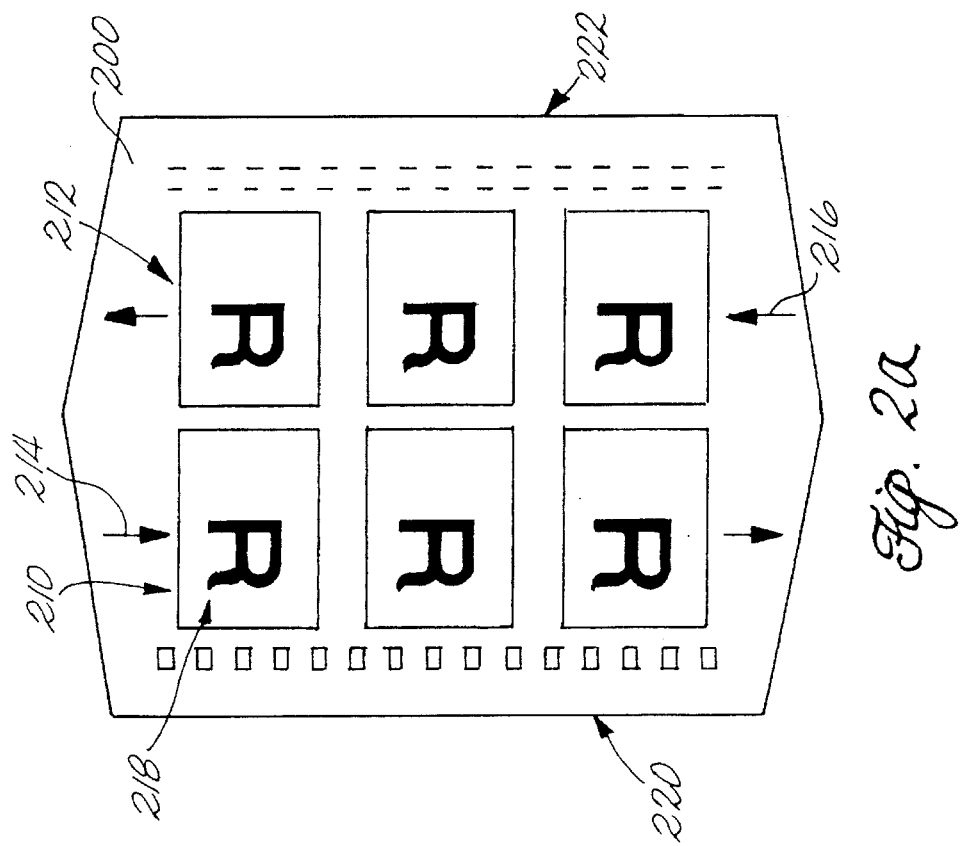
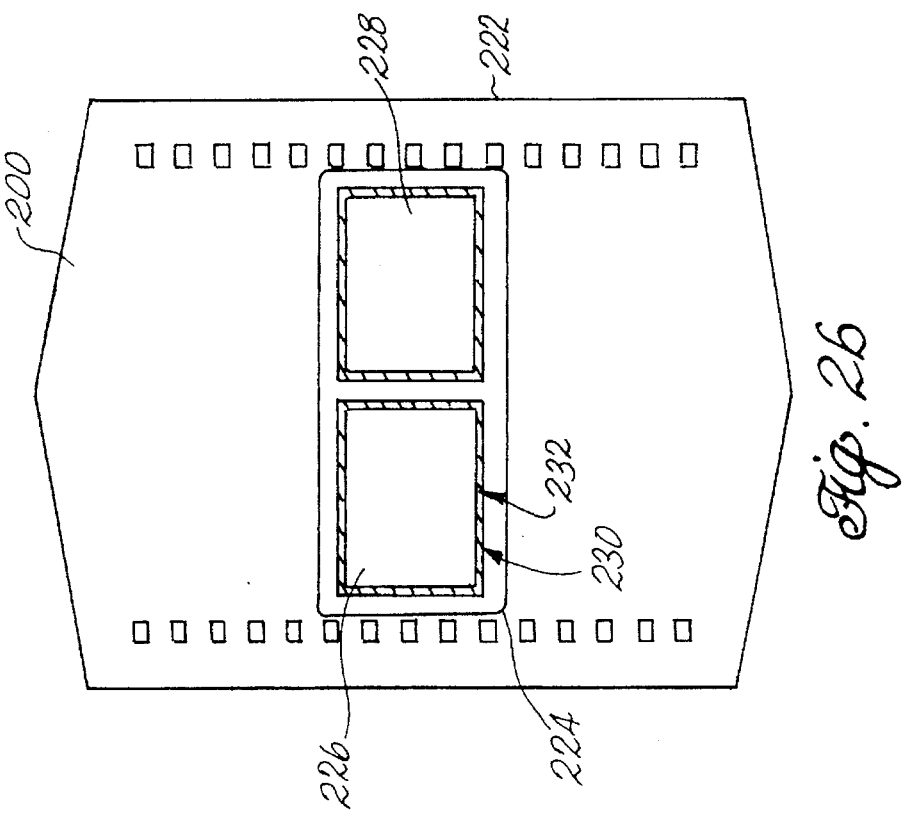

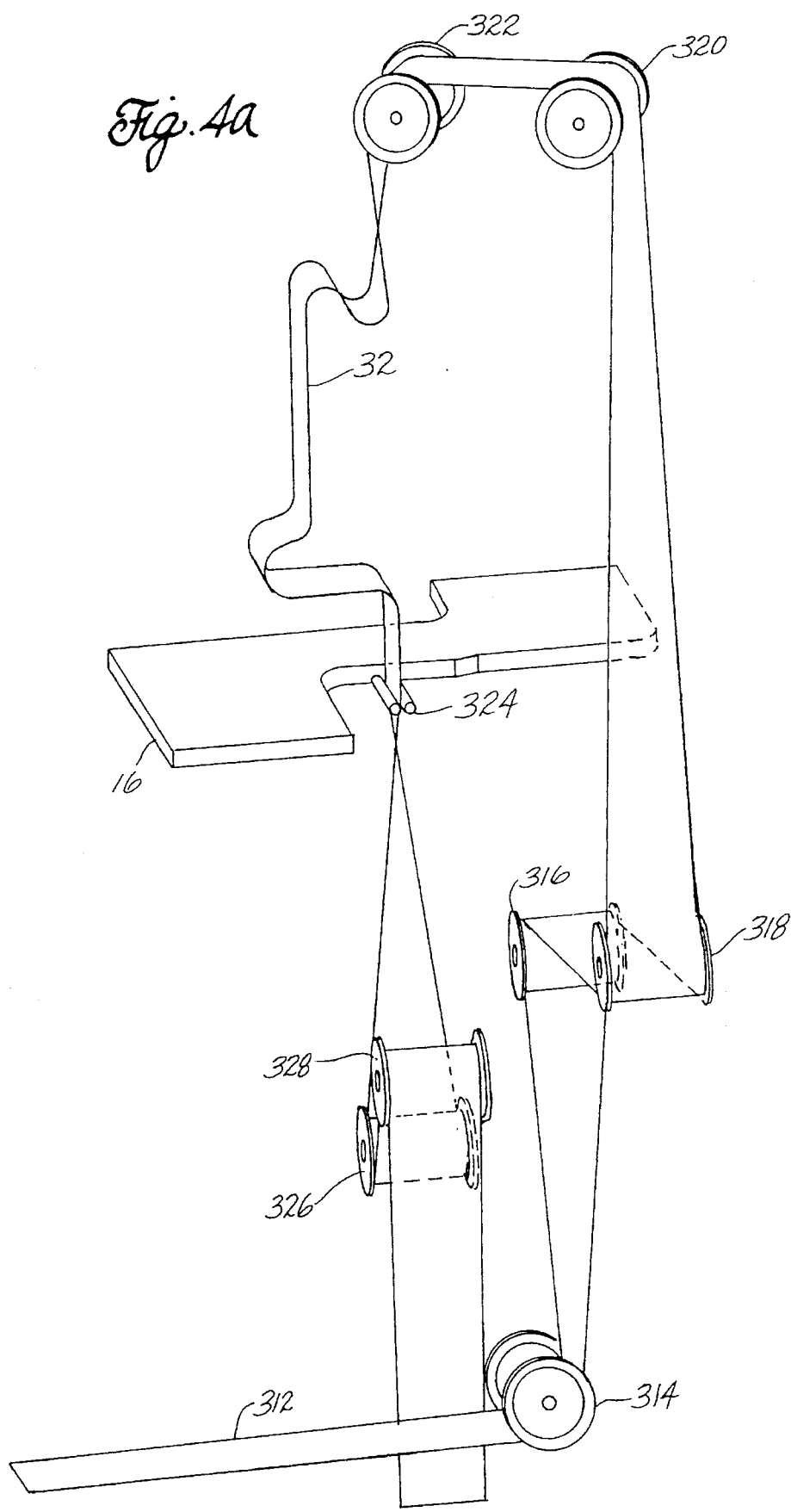

FIG.5

```
                                                                          400
                                                                   402   /
                                                            ppppppppppppS·····   400
                                                   ·····ppppppppppppS*****     /
                                                  402
                                               ·····Sppppppppppp*****
         |---- SHOW 4 ----|---- SHOW 3 ----|
         3       2       1       0       2       1       0
         432109876543210987654321029876543210987654321 0

0123456789012345678901234012345678901234567890 12
         0       1       2       3       0       1       2
         |---- SHOW 1 ----|---- SHOW 2 ----|

··· CLEAR LEADER    S START    ppp PICTURE    *** BLACK LEADER

NUMBER OF SHOWS = 4    SHOW LENGTHS:  1   2   3   4
                                     35  23  23  35
```

REVERSING FILM PROJECTION SYSTEM

BACKGROUND OF THE INVENTION

1. Field of the Invention

The present invention relates generally to the field of automated projection systems for displaying movie film. In particular the invention provides film having images printed side by side to allow presentation of one set of images in a forward direction and the adjacent images in a rearward direction by moving the projection head and associated aperture plate and film guide laterally with respect to the lens and lamp-house for display of the film images.

2. Prior Art

Movie film projection equipment requires complex mechanical systems to drive the film through the projector to provide smooth image projection. Years of effort have resulted in highly sophisticated mechanical systems to achieve this end.

Even for short subjects, cartoons, or other short films the length of film becomes very long. Typical feature length films require extremely large film reels and may employ multiple film reels projected sequentially on different projectors to provide a full length motion picture film. At the conclusion of such a film presentation the film must be rewound to be available for the next presentation. The requirement for rewinding limits the ability to automate film projection systems. Even if the film is rewound with the film remaining in the projector gate to allow automation by merely reversing the film for rewind, a significant time period is required for rewinding the film to its start point.

In the alternative, for certain applications, highly sophisticated and mechanically complex continuous loop systems have been developed to allow immediate replay of a film. The cost and complexity of these systems however preclude large scale distribution at reasonable cost.

The concept of printing multiple images side by side on a single film to allow presentation of one image in a forward direction and presentation of the second image in a reverse direction has been known. Exemplary of this prior art is European Patent Publication 0191559 by inventor John Mosely. Early reversing projector systems provided the basic approach for allowing a single projector to continuously display a film without film rewinding while eliminating the complexity of the endless loop systems.

The present invention provides refinement of the reversing projector concept to simplify the mechanical arrangement of the projector thereby reducing cost and providing high quality image projection.

SUMMARY OF THE INVENTION

The film projection of the present invention relies on film incorporating a first set of images arranged in frames spaced from a first edge of the film for sequential display by motion of the film in a forward direction and a second set of images arranged in frames spaced from the opposite edge of the film for sequential display by motion of the film in a reverse direction. The projection system incorporates a lamp house positioned for focusing the projection light on a defined planar geometrical location or aperture window and a lens positioned to project images from the aperture window to a screen, in combination with a projection head which is laterally movable from a first position for showing film in the forward direction to a second position for showing film in the reverse direction. The projection head incorporates a reversible drive mechanism receiving the film and selectively moving the film in the forward direction when the projection head is located in the first position and the reverse direction when the projection head is located in the second position.

The projection head incorporates an aperture plate having a first aperture aligned with the first set of film frames and a second aperture aligned with the second set of film frames. With the projector head in the first position the first aperture of the aperture plate is aligned with the aperture window and with the projection head in the second position the second aperture in the aperture plate is aligned with the aperture window. A projector base carrying the projector head rides on linear bearings and is moved from the first position to the second position by a slide cylinder which may be pneumatically, hydraulically, or electro-mechanically operated.

Film take-up rollers oriented in the plane of film travel are structurally mounted to the movable projector base for proper film tracking in either the first or second position of the base without the need for manual adjustment of film reels or take-up roller systems during motion of the projector base from the first position to second position or second position to first position.

Dimensioning of the first and second apertures in the aperture plate to accommodate dimensional tolerancing in the reversible drive mechanism due to sprocket engagement with the perforations in the film prevents shift of the projected film area on the screen during forward and reverse projection.

BRIEF DESCRIPTION OF THE DRAWINGS

The features of the present invention are better understood in reference to the following drawings.

FIG. 1 is a perspective view of the elements of the system including the projection head and associated projection base, the lamp base and lamp house, and the projector lens.

FIG. 2a shows the film layout for use with the present invention with laterally displaced forward drive images and reverse drive images.

FIG. 2b shows dimensioning of the apertures in the aperture plate relative to the film frames for compensation of dimensional tolerances in the projector drive.

FIG. 4a is a perspective view looking from the left rear quadrant showing an alternate view of the film support roller system with respect to the projector base.

FIG. 4b is a front view of the system.

FIG. 5 is a schematic representation of film layout for use with the invention.

DETAILED DESCRIPTION OF THE INVENTION

Figure 2C:
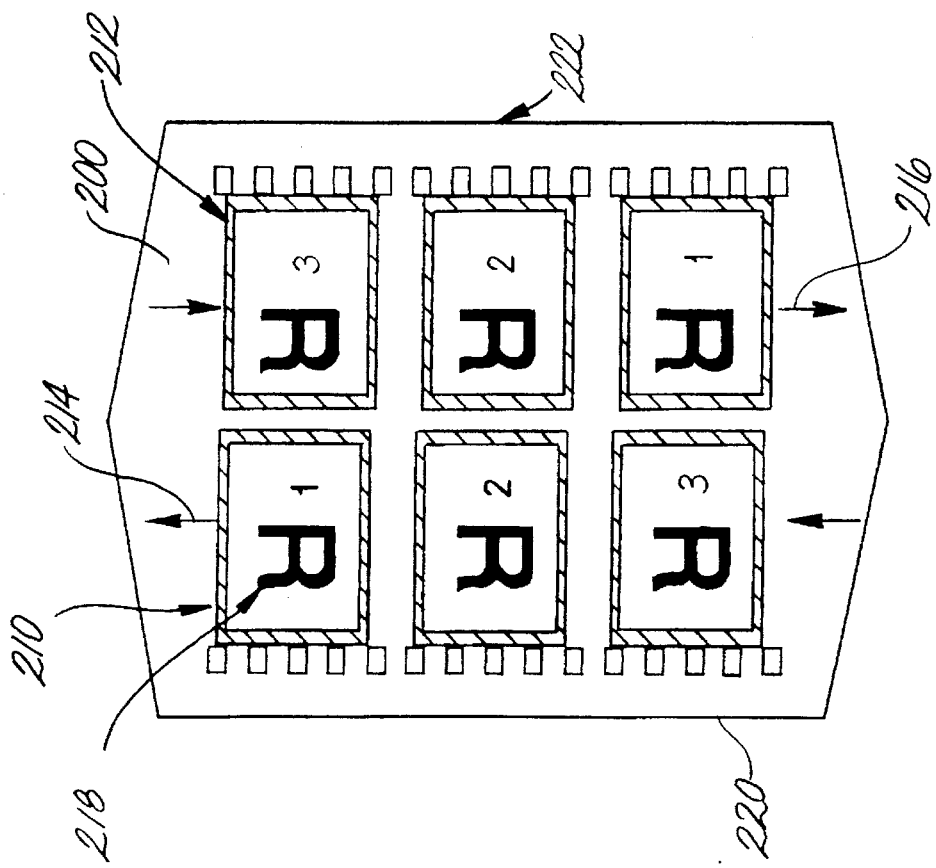
FIGS. 2c and 2d show an alternative embodiment to that disclosed in FIGS. 2a and 2b.
Figure 2D:
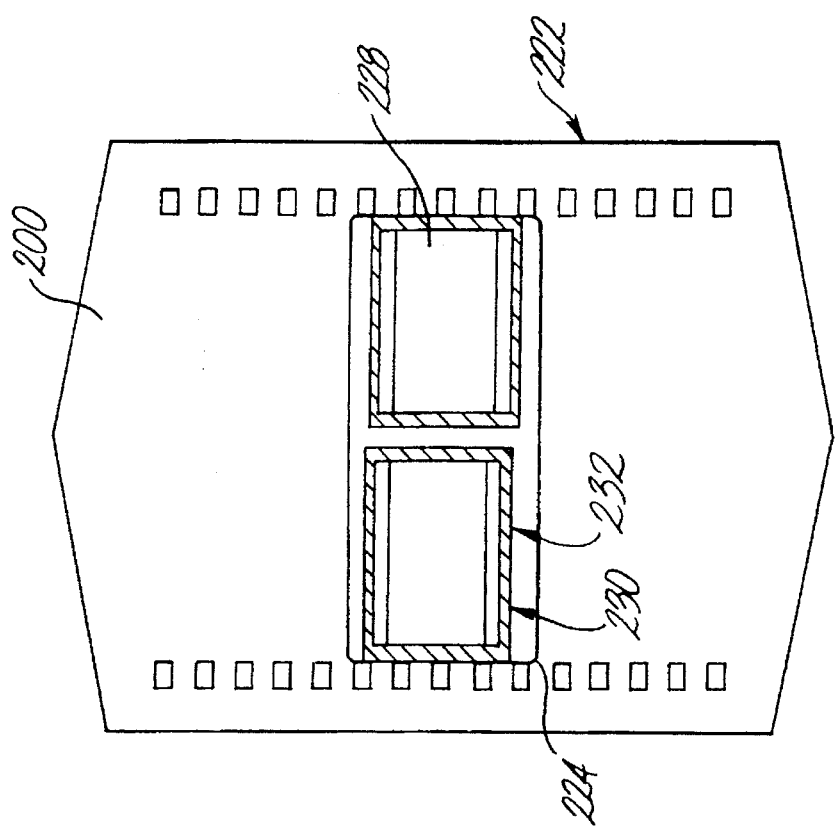

FIG. 1 demonstrates the mechanical arrangement of elements of the invention. A lamp base (LB) 10 provides a rigid structural mounting for the lamp house 12 and support structure for other elements of the invention. A projection head 14 is mounted to a projection base (PB) 16 which is laterally movable from a first position to a second position, shown in phantom, offset by a lateral dimension D of approximately 1 inch. Elements of the projection head include a reversible drive motor 18 with associated drive pulley 20 for operation of the mechanical elements of the projection head. The projection head employs a standard Geneva movement which is well known in the art and will not be described in detail in the present disclosure. The projection base is supported on linear shafts 22 by linear bearings at multiple locations as exemplified by linear bearing 24. The linear shafts are mounted on appropriate brackets 26 to the lamp base. A slide cylinder actuator 28 connected to the projection base and lamp base provides actuation for movement of the projection head from the first position to second position. A standard pneumatic, hydraulic, or electromechanical actuator is employed depending on the particular application. A projection lens 30 is rigidly mounted to the lamp base in axial alignment with the light source in the lamp house. Positioning of the lamp house and lens on the lamp base focuses light on an aperture window which is spatially defined for planar alignment with an aperture plate 32 containing two apertures to be disclosed in greater detail subsequently. Lateral motion of the projection head aligns one of the two apertures with the aperture window thereby providing maximum intensity of the focus light from the lamp house for projection of film images aligned in the aperture.

An automatically controllable dowser 34 is provided to control light from the lamp house as will be described in greater detail subsequently. A microprocessor controller 36 provides control for automated operation of the system including selection of forward or reverse drive for motor 18, actuation of the slide cylinder 28 to position the projection head in the first or second position, operation of the dowser, and control of film play-out and take-up as will described in greater detail subsequently.

For the embodiment shown in the drawings, film configuration is as shown in FIGS. 2a and 2b. A section of the film 200 is shown with printed frames. In the embodiment disclosed herein standard 70 millimeter 5 perforation (perf) film is employed. A first image set of 35 millimeter frames 210 is printed on the film in 35 millimeter format while a second set of film frames 212 is printed laterally adjacent the first frames. The first set of frames is printed for projection of film images with the film traveling in a forward direction identified by arrows 214. While the second set of frames is printed with images for projection in a reverse direction of the film as shown by arrows 216. Orientation of the images in the frames is standard inverted presentation as shown by "R" designated 218. Spacing of the film frames at approximately 0.9375 inches is based on standard 5 perf 70 millimeter film format.

The film frames oriented for the forward direction of film travel are spaced adjacent a first film edge 220 while frames oriented for reverse direction projection are spaced from the second film edge 222. Frames in forward direction and reverse direction are oriented substantially directly laterally for the embodiment shown in FIG. 2a. Those skilled in the art will recognize that dimensional orientation of frames on the film will be obtained from the guided edge of the film. FIG. 2b shows approximate dimensions for film printed for the embodiments of the inventions shown in the drawings wherein edge 222 is the guiding edge. As a reference, box 224 identifies a standard 65 millimeter 5 perf camera aperture having a dimension of 2,072 inches by 0.9055 inches. In the present invention apertures 226 and 228 in the aperture plate 32 (as shown in FIG. 1) are laterally spaced 1 inch center to center. To accommodate dimensional tolerance in the drive mechanism between the forward and reverse direction due to dimensional differences between the intermittent drive sprocket teeth with the vertical height of perforations in the film, dimensions of the first and second apertures are reduced from the film frame size. As shown in FIG. 2b the boundary of the image area 230 for the film frames is approximately 0.700 inches by 0.900 inches. To maintain the 1.35 aspect ratio of the original images the apertures in the aperture plate are sized to provide a projectable image area 232 of approximately 0.600 inches by 0.810 inches. The reduction in the vertical dimension PV in the aperture plate is less than the vertical dimension of the optical image OV by an amount slightly greater than the dimensional tolerance in the reversible drive between the forward direction and reverse direction thereby assuring a properly framed image for projection in either the forward or reverse direction.

In an alternate embodiment shown in FIGS. 2c and *d*, printing of laterally adjacent film frames is offset by an amount equivalent to the dimensional tolerance in the reversible drive mechanism to accommodate display through apertures in the aperture plate which are sized to reduce masking approaching the boundary of the image area.

In a second alternate embodiment, the mounting height of the linear shafts 22 supporting the projection base are altered from the ends of the shafts proximate the first position to the ends of the shafts proximate the second position by an amount sufficient to compensate for the dimensional differences between the base of the teeth of the intermittent sprocket and the vertical height of the film perforations in the forward and reverse directions. Translations of the projection base from the first position to second position then results in a vertical displacement of the projection base and, consequently, the projection head to achieve the compensation for the film formats shown. A vertical dimensional change of approximately 0.050 inches from the first position to the second position would be required.

Figure 3:
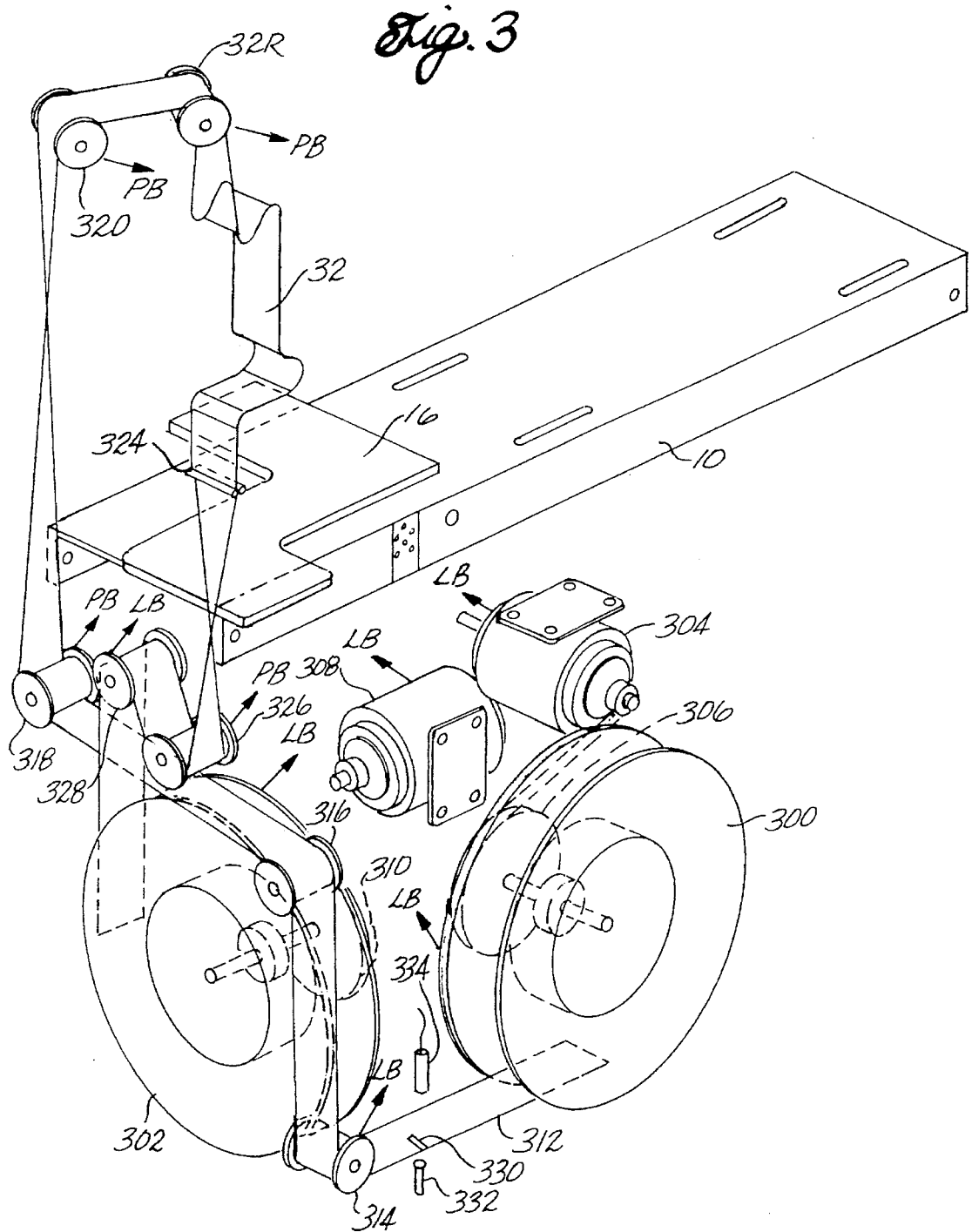
FIG 3 is a perspective view from the forward lefthand corner of the system showing relative positioning of the lamp base (LB), projector base (PB), film play-out and take-up reels and associated servo-drives and the film support roller system.
Figure 46:
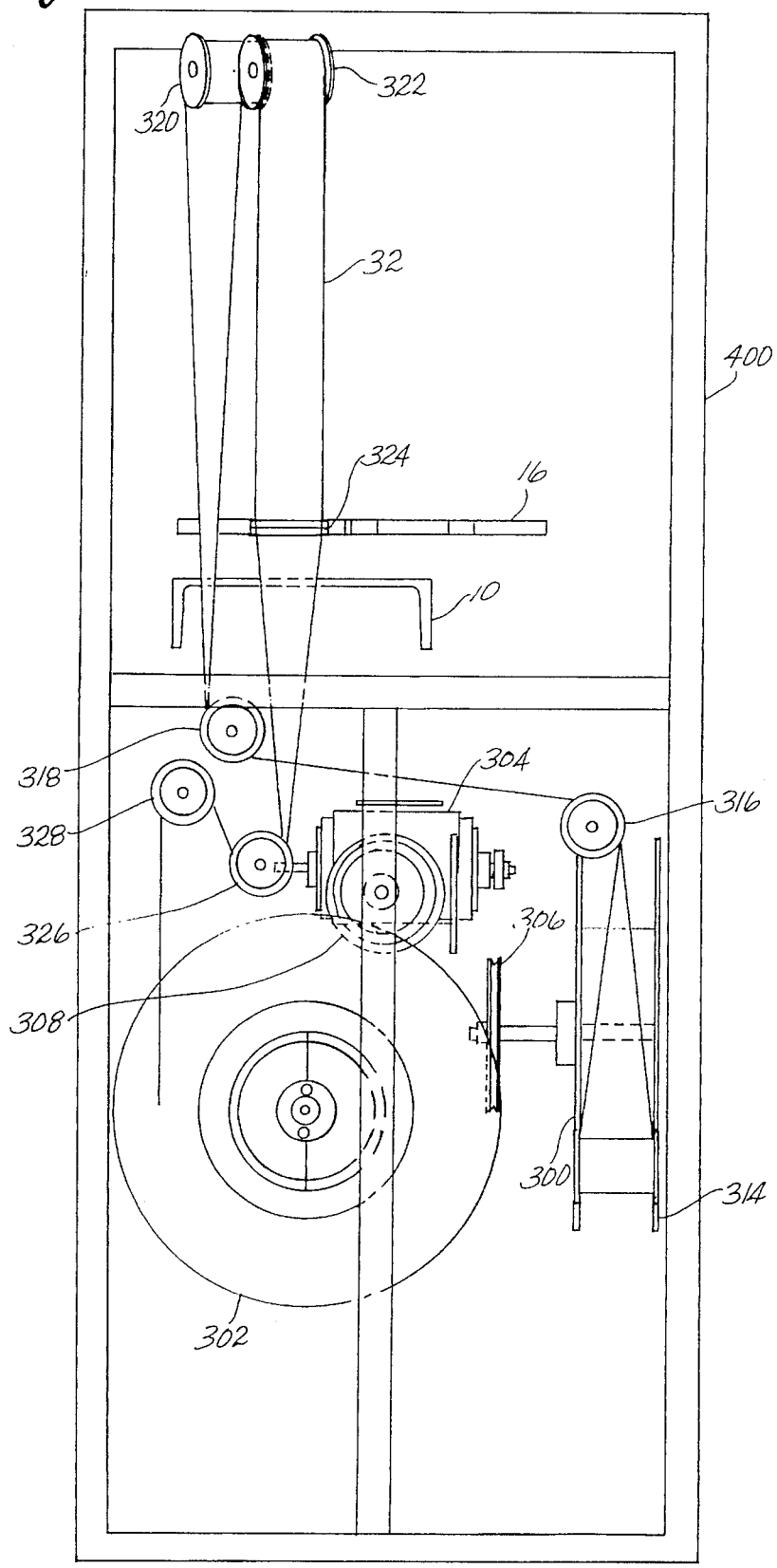

Elimination of the requirement for film rewinding by the reversible projection head in the present invention provides significant advantages over the prior art. However, to allow film storage for large capacity reels and to avoid the requirement of mounting film reels on the moving projector base the present invention incorporates a novel film support roller system as shown in FIG. 3. The forward direction film play-out reel 300 (which comprises the reverse direction take-up reel) and the forward direction take-reel 302 are rigidly mounted to the lamp base or structure supporting the lamp base (components of FIG. 3 which are mounted to the lamp base are identified with designators LB. Similarly components mounted to the movable projector base carry identifiers PB. A first controllable servomotor 304 rigidly mounted to the lamp base support structure is associated with the first film reel and, in the embodiment shown, connects to the drive pulley 306 of the first reel by a drive belt (not shown). Similarly a second controllable servomotor 308 is rigidly mounted to the lamp base and drives the second film reel by a pulley 310 (also not shown). In the embodiment shown in FIG. 3 the first film reel is mounted perpendicular to the direction of motion of the projection base while the second film reel is mounted parallel to the direction of the projection base. Both reels are mounted parallel or perpendicular to the projection base in alternative embodiments to accommodate best arrangement within the projection cabinet as will be described in greater detail subsequently.

For film travel in the forward direction, film 312 is drawn from the first reel over roller 314 which is rigidly mounted to the lamp base with an axis of rotation substantially parallel to the direction of motion of the projection base. For alternate embodiments where the first reel is mounted parallel to the direction of the motion of the projection base roller 314 would be mounted with its axis of rotation perpendicular to the direction of motion of the projection base. The film travels from roller 314 to a second roller 316 also mounted to the lamp base and having an axis of rotation substantially perpendicular to the direction of motion of the projection base. Rollers 314 and 316 are placed in spaced relation to allow rotation of the film through 90° without kinking. The film travels from roller 316 to a third roller 318 which is mounted to the projection base with its axis of rotation substantially perpendicular to the direction of motion of the projection base. Mounting of roller 318 to the projection base allows motion of the projection base from the first position to the second position without impact on the film feed since film travel between rollers 316 and 318 is in alignment with the motion of direction of the projection base. Roller 316 or 318 or both incorporate in their mounting a spring mounted idler arm to maintain film tension during motion of the projection base.

Film travels from third roller 318 to a fourth roller 320 which is mounted to the projection base above the film drive mechanism and laterally displaced sufficiently to preclude interference with the film traveling from roller 318 to roller 320 with the image projection. Rollers 318 and 320 are mounted in space relation to allow rotation of the film through approximately 80° without kinking. The film travels from roller 320 to roller 322 which is also mounted to the projection base above the film drive mechanism. The axes of rotation for rollers 320 and 322 are substantially parallel and roller 322 is mounted sufficiently above the film drive mechanism to allow the film to rotate the remaining approximately 10° for proper alignment with the projection system.

The film is drawn through the projection system (not shown) behind aperture plate 32. The film exits the projection drive mechanism and is engaged by pinch rollers 324 which maintain the alignment of the film with the projection mechanism. The film then travels to roller 326 which is mounted to the projection base with its axis of rotation substantially perpendicular to the direction of motion of the projection base. Roller 326 is mounted in spaced relation to pinch rollers 324 to allow rotation of the film through substantially 90° without kinking. The film travels from roller 326 to roller 328 which is mounted to the lamp base. As previously described with regard to rollers 316 and 318, rollers 326 and rollers 328 are aligned whereby the direction of film travel is parallel to the direction of motion of the projection base and mounting of one or both of rollers 326 and 328 to idler arms having tensioning springs maintains film tension during motion of the projection base. The film travels from roller 328 to the second film reel 302 for take-up in the forward film direction. The film path is reversed for the reverse film direction with reel 302 acting as the play-out reel and reel 300 acting as the take-up reel. In configurations of the cabinet wherein mounting of the second reel 302 perpendicular to the direction of motion of the projection base is employed, an additional roller mounted to the lamp base having an axis of rotation substantially parallel to the direction of motion of the projection base is mounted in spaced relation to roller 328 to allow rotation of the film through 90° of travel prior to take-up on the second reel 302. As previously described, if mounting of the first reel 300 is desired in an orientation perpendicular to the direction of motion of the projection base, roller 314 is mounted with its axis of rotation perpendicular to the direction of motion of the projection base or may be eliminated with film running directly from first reel 300 to roller 316. In the embodiment shown in the drawings mounting of both film reels below the lamp base and projection head allows the projector to be positioned high in a projection booth without upper reel interference in order to project over the heads of an audience in a theater with minimum vertical clearance.

Figure 4C:
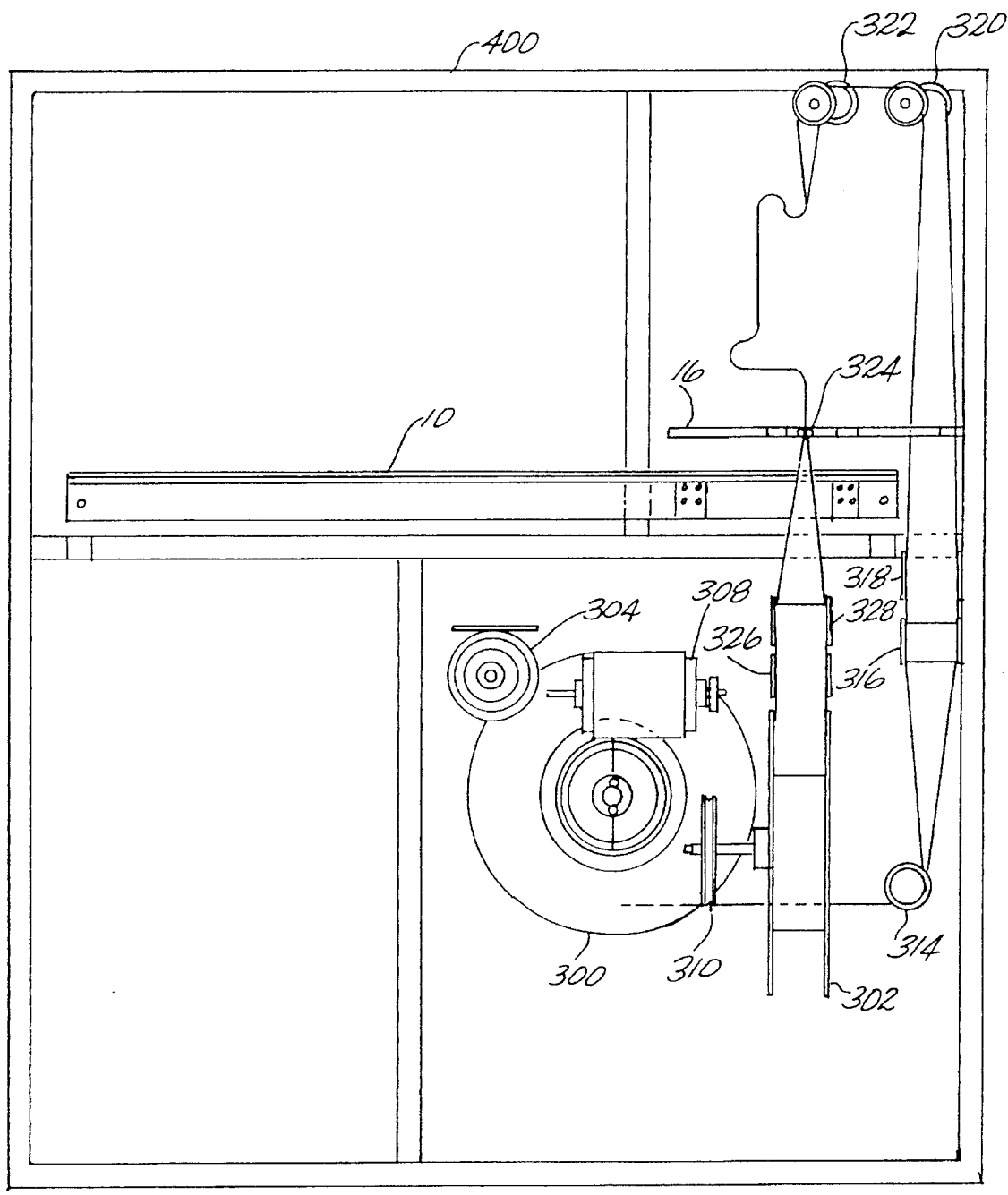
FIG. 4c is a left side view of the system.

FIG. 4a provides an alternate view of the film takeup system demonstrating the relationship between the rollers and the play-out and take-up reels. FIGS. 4b and 4c also show alternate views of the film handling system including structural outline 400 for a cabinet enclosing the entire projection system. The arrangement of the present invention allows compact mounting of the projection system and film storage and guidance components in a single closed cabinet allowing excellent environmental control for both the projection system and film with filtered intake air to preclude film and component damage.

As previously described the present invention is capable of autonomous continuous operation employing a microprocessor based controller for operation of the servo-torque motors, for the take-up and play-out film reels, the reversible projection head motor, the projection-based positioning actuator, and the dowser. In operation the microprocessor performs the following operations. Upon initialization by an operator through a start key or similar device the microprocessor powers the servo-torque motors for the film reels in the forward direction to provide appropriate tension for hold-back and take-up. The microprocessor then directs motion of the projection head motor in the forward direction integrated with SMPTE or other time code queuing steps to any audio source for an audio track on the film, steps 608–612 of FIG. 6a. The microprocessor then monitors for a film frame count provided by a counter integral to the projection head for a count indicating show start, step 614. The show start indicator is commensurate with the initial image frame of the motion picture. The controller then commands the lamp house dowser open, step 616, and the show runs continuously with the microprocessor monitoring a frame count indicating show completion, step 618. Those skilled in the art will recognize that several separate film subjects may be presented during the forward direction of play.

Upon reaching the stop count the microprocessor controller closes the dowser, step 620 and stops the projection drive motor and film reel servo-torque motors. The microprocessor then commands the actuator for the projection base to move the projection base from its first position to its second position for reverse operation. The projector motor and take-up and supply reel torquemotors are commanded by the microprocessor controller to operate in reverse order and the microprocessor controller monitors the frame count for the show start indication for the reverse direction. Upon receiving the proper frame count for show start the microprocessor commands the lamp house dowser to open and the film presentations for the reverse direction are shown. The microprocessor controller monitors the film frame count for a show stop indication and upon receiving the frame count indicating the end of the show for the reverse direction closes the lamp house dowser and stops the projection head motor and servo-torque motors for the film take up reels. The microprocessor then commands the actuator to move the projection base from its second position to the original first position to allow forward operation. The projection head motor, take-up and supply reel servo-torque motors are again operated in the forward direction by the microprocessor to again replay the forward direction film subjects. This continuous operation is maintained until a system stop signal is received from an operator.

Details of the synchronization of frame count and operations controlled by the microprocessor controller is further described in reference to FIGS. 5 and 6a–c. FIG. 5 demonstrates layout of the laterally adjacent film images for forward and reverse direction with designators for clear leader 400, black leader 402, show start count S and picture frames p in relation to the forward count for the film frame counter in the forward direction for shows 1 and 2 and for the count on the film frame counter in the reverse direction for shows 3 and 4. Those skilled in the art will recognize that a four show example is employed however multiple shows on each film direction may be employed. For ease of demonstration in the figures equal show lengths for shows 1 and 4 and shows 2 and 3 have been chosen with the figure demonstrating show 1 at 35 frames and show 2 at 23 frames. To obtain equal length in the forward and reverse directions shows in one direction or the other may be padded with leader to provide equal forward and reverse direction frame counts.

Figure 6A:
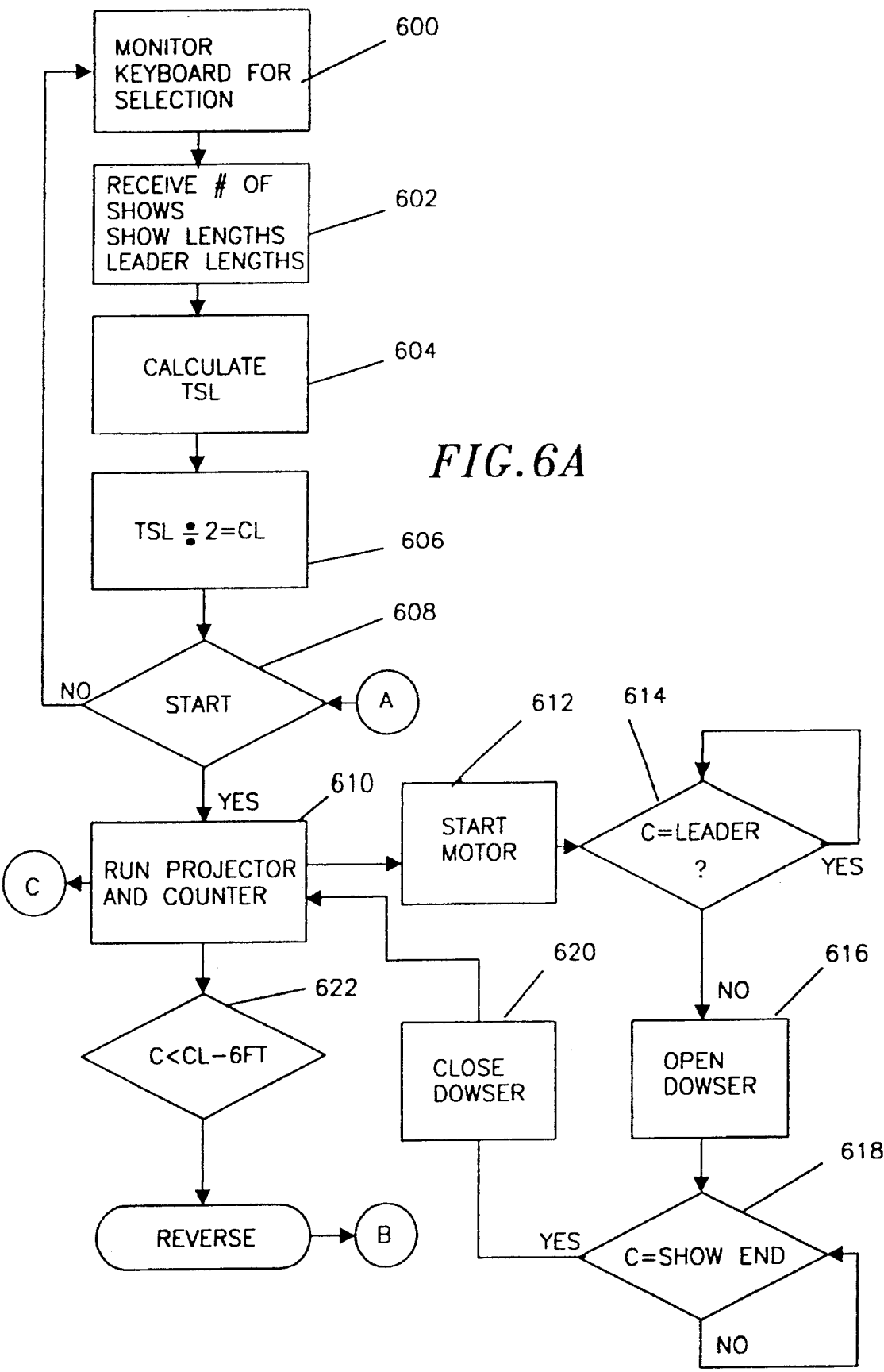
FIGS. 6a–c are flow charts demonstrating the software control sequences for automatic autonomous operation of the projection system under control of a microprocessor based controller.
Figure 6B:
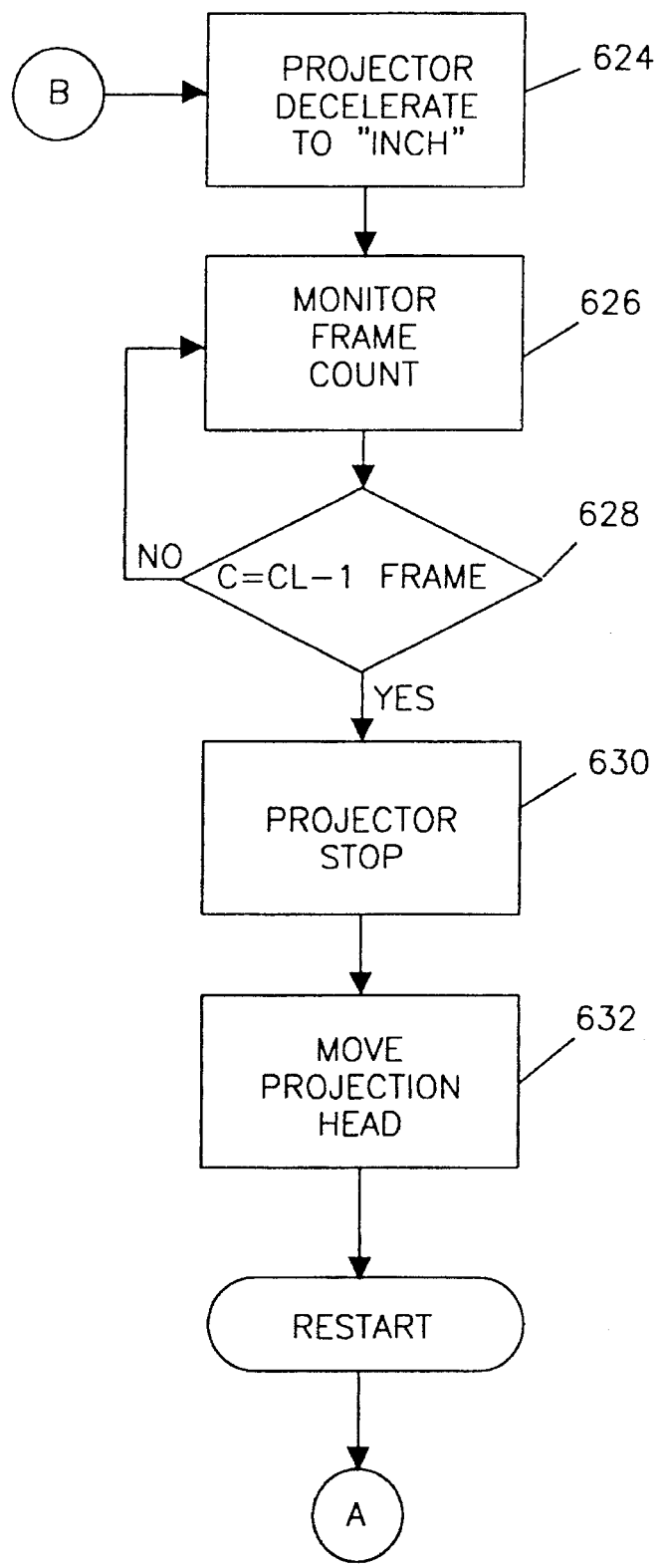
Figure 6C:
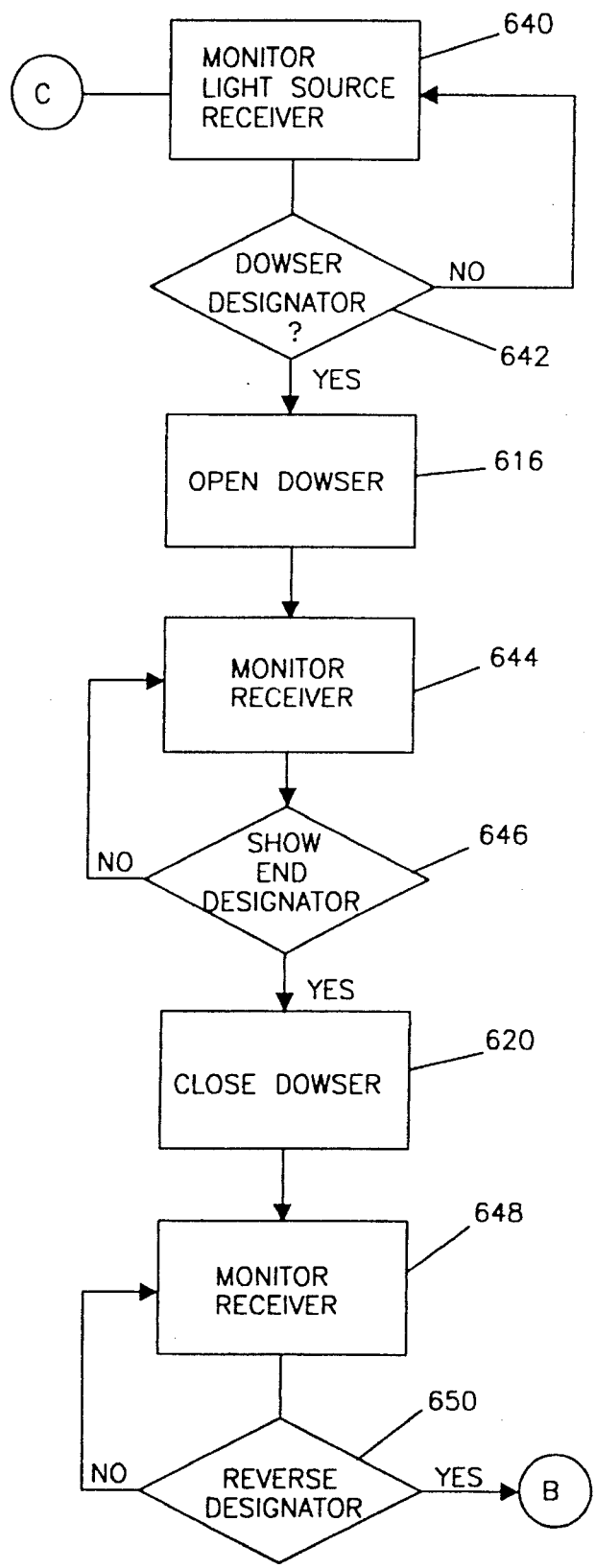

As shown in FIGS. 6a–c the microprocessor controller monitors a keypad or other means for operator input for selection of uni-directional or bi-directional operation, step 600. The operator then enters the number of shows and corresponding show lengths for the film loaded into the system, step 604. The microprocessor controller calculates the total show length (TSL) by adding the lengths of individual shows entered by the operator, step 604. In the present example 35, 23, 23 and 35 for a total TSL of 116. The microprocessor controller then divides the total show length by 2 rounding down to obtain a counter length (CL) to determine the forward and reverse counter length, step 606. In operation if the count value is less then CL the show runs forward while if the count is greater than CL the microprocessor drives the projection head and associated motors in reverse. Those skilled in the art will recognize that the film frame counter may be zeroed upon reversal as opposed to zeroed upon reaching the end count of the reverse show.

The reversal process is accomplished by the microprocessor controller. When the film frame count indicates film position is about 6 feet from the direction reversal count, step 622, the microprocessor controller places the projection head in auto-stop mode. This mode causes the projector motor to decelerate and "inch" to the reverse frame count, step 624. When the frame counter indicates one frame from reversal direction, steps 626 and 628, the projector motor is shut off by the microprocessor controller, step 630. The film position my coast, however actual film halt should occur at the reversal direction frame. The microprocessor controller then accomplishes the projection head move, step 632 and commences operation in the reverse direction.

As an alternative to the use of a frame counter or in combination with the use of frame counter, physical designators on the film surface are employed in combination with a detector system by the microprocessor controller for designation of control points in the film reversal process. As shown in FIG. 3, a metallic tape stripe 330 is placed on the film at a desired control location which blocks light source 332 from receiver 334. Those skilled in the art will recognize that a reflective system employing a source and receiver on the same side of the film can be used as an alternative. The physical marker employed on the film is used to create an external signal which replaces a film count measurement for use by the microprocessor in creating a control function. Multiple physical markers may be applied to the film for signaling reversal of film direction including movement of the projection head, steps 648 and 650 as shown in FIG. 6c, dowser open, steps 644 and 646, and dowser closed, steps 641 and 646. Use of a physical marker on the film is also employed in alternate embodiments to initiate the frame counter or other timing means within the microprocessor to accomplish the desired control functions.

Having now described the invention in detail as required by the patent statutes those skilled in the art will recognize minor substitutions and modifications to the components of the embodiments disclosed in the specification. Those modifications and substitutions are within the scope of the present invention as defined in the following claims.

What is claimed is:

1. A movie projection system comprising:

film incorporating a first plurality of images arranged in frames spaced from a first edge of the film for sequential display by motion of the film in a forward direction and a second plurality of images arranged in frames spaced from a second edge of the film for sequential display by motion of the film in a reverse direction, the frames of the second plurality positioned substantially horizontally adjacent the frames of the first plurality;

a lamp house positioned for focusing projection light on an aperture window;

a lens positioned to project images from the aperture window to a screen;

a projection head movable from a first position to a second position and having a reversible film drive mechanism receiving the film and selectively moving the film in the forward direction with the projection head in the first position and the reverse direction with the projection head in the second position, an aperture plate incorporating a first aperture aligned with the first plurality of film frames and a second aperture aligned with the second plurality of film frames, the first aperture further aligned with the aperture window in the first position of the projection head and the second aperture aligned with the aperture window in the second position, and means for moving said projection head from said first to said second position.

2. A movie projection system as defined in claim 1 wherein the second plurality of frames of the film are offset vertically from said first plurality by a predetermined amount to compensate for dimensional differences between the base of the teeth of an intermittent sprocket and the vertical height of the film perforations in the forward direction and the reverse direction.

3. A movie projection system as defined in claim 1 wherein the second position of the projection head is vertically displaced from the first position by a predetermined amount to compensate for dimensional differences between the base of the teeth of an intermittent sprocket and the vertical height of the film perforations in the forward direction and the reverse direction.

4. A movie projection system as defined in claim 1 wherein the first aperture in the aperture plate has a vertical dimension, PV1, less than a vertical dimension, OV1, of the images on the first plurality of frames and the second aperture in the aperture plate has a vertical dimension, PV2, less than a vertical dimension, OV1, of the images on the second plurality of frames, whereby PV1–OV1 and PV2–OV2 are greater than the dimensional differences between the base of the teeth of an intermittent sprocket and the vertical height of the film perforations in the forward direction and the reverse direction.

5. A movie projection system as defined in claim 4 wherein the first aperture and second aperture have horizontal dimensions predetermined relative to their vertical dimensions to provide a desired aspect ratio on the projected image.

6. A movie projection system as defined in claim 1 wherein the means for moving the projection head and the film drive mechanism receive a first control input for moving the projection head to the first position and selectively operating in the forward direction and a second control input for moving the projection head to the second position and selectively operating in the reverse direction, the system further comprising:

a lamp house dowser;

an absolute film frame counter;

a projection controller for the projection head, film drive mechanism and dowser, said controller receiving frame count from the frame counter and opening the dowser at a predetermined frame count in the forward direction and closing the dowser at a second predetermined frame count in forward direction, and opening the dowser at a third predetermined frame count in the reverse direction and closing the dowser at a fourth predetermined frame count in the reverse direction.

7. A movie projection system as defined in claim 6 further comprising:

first and second film reels;

first and second controllable motors driving said film reels; and wherein said first control input drives the controllable motors in a forward direction and said second control input drives said motors in a reverse direction.

8. A movie projection system as defined in claim 7 wherein the controllable motors are servo-driven torque motors.

9. A movie projection system as defined in claim 1 wherein the projection head is mounted to a moveable projection base for motion from said first position to said second position and said projection base is movably mounted to a rigid lamp base said system further comprising:

a first film path guide roller mounted to said projection base and having an axis of rotation substantially perpendicular to an axis of motion for said projection base from said first position to said second position;

a second film path guide roller mounted to said lamp base with an axis of rotation substantially perpendicular to said axis of motion of the projection base; and said second film path guide roller receiving film from a film reel for transmission to said first guide path roller the film proceeding from said first guide path roller to the projection head for display.

10. A movie projection system as defined in claim 9 further comprising:

a third film path guide roller mounted to the projection base with an axis of rotation substantially perpendicular to the axis of motion of the projection base and a forth film path guide roller mounted to said lamp base with an axis of rotation substantially perpendicular to the axis of motion for the projection base; and said third guide roller receiving film from the projection head for transmission to the forth guide roller which in turn provides film to the second reel.

11. A movie projection system as defined in claim 12 mounted in a self-contained environmental cabinet with filtered intake air.

12. A movie projection system comprising:

film incorporating a first plurality of images arranged in frames spaced from a first edge of the film for sequential display by motion of the film in a forward direction and a second plurality of images arranged in frames spaced from a second edge of the film for sequential display by motion of the film in a reverse direction, the frames of the second plurality positioned substantially horizontally adjacent the frames of the first plurality;

a lamp house positioned for focusing projection light on an aperture window;

a lens positioned to project images from the aperture window to a screen;

a projection head movable from a first position to a second position and having a reversible film drive mechanism receiving the film and selectively moving the film in the forward direction with the projection head in the first position and the reverse direction with the projection head in the second position, an aperture plate incorporating a first aperture aligned with the first plurality of film frames and a second aperture aligned with the second plurality of film frames, the first aperture further aligned with the aperture window in the first position of the projection head and the second aperture aligned with the aperture window in the second position, and means for moving said projection head from said first to said second position, wherein the means for moving the projection head and the film drive mechanism receive a first control input for moving the projection head to the first position and selectively operating in the forward direction and a second control input for moving the projection head to the second position and selectively operating in the reverse direction, a lamp house dowser;

an absolute film frame counter;

a projection controller for the projection head, film drive mechanism and dowser, said controller receiving frame count from the frame counter and opening the dowser at a predetermined frame count in the forward direction and closing the dowser at a second predetermined frame count in forward direction, and opening the dowser at a third predetermined frame count in the reverse direction and closing the dowser at a fourth predetermined frame count in the reverse direction, said controller including means for providing the first control input responsive to an external signal, and means for removing said first control input responsive to a fifth predetermined frame count.

13. A movie projection system as defined in claim 12 wherein said controller includes means for providing said second control input responsive to a timer initiated by said fifth predetermined frame count.

14. A movie projection system as defined in claim 12 wherein said controller includes means for providing the second control input responsive to a second external signal.

15. A movie projection system comprising:

film incorporating a first plurality of images arranged in frames spaced from a first edge of the film for sequential display by motion of the film in a forward direction and a second plurality of images arranged in frames spaced from a second edge of the film for sequential display by motion of the film in a reverse direction, the frames of the second plurality positioned substantially horizontally adjacent the frames of the first plurality;

a lamp house positioned for focusing projection light on an aperture window;

a lens positioned to project images from the aperture window to a screen;

a projection head movable from a first position to a second position and having a reversible film drive mechanism receiving the film and selectively moving the film in the forward direction with the projection head in the first position and the reverse direction with the projection head in the second position, an aperture plate incorporating a first aperture aligned with the first plurality of film frames and a second aperture aligned with the second plurality of film frames, the first aperture further aligned with the aperture window in the first position of the projection head and the second aperture aligned with the aperture window in the second position, and means for moving said projection head from said first to said second position, wherein the means for moving the projection head and the film drive mechanism receive a first control input for moving the projection head to the first position and selectively operating in the forward direction and a second control input for moving the projection head to the second position and selectively operating in the reverse direction;

a lamp house dowser;

an absolute film frame counter;

a projection controller for the projection head, film drive mechanism and dowser, said controller receiving frame count from the frame counter and opening the dowser at a predetermined frame count in the forward direction and closing the dowser at a second predetermined frame count in forward direction, and opening the dowser at a third predetermined frame count in the reverse direction and closing the dowser at a fourth predetermined frame count in the reverse direction, said controller including means for providing the first control input responsive to an external signal, and means for removing said first control input responsive to a fifth predetermined frame count, means for providing the first control input responsive to an external signal, means for removing said first control input responsive to a third external signal and means for providing the second control input responsive to a timer initiated by said third external signal.

\* \* \* \* \*

UNITED STATES PATENT AND TRADEMARK OFFICE
CERTIFICATE OF CORRECTION

PATENT NO. : 5,581,313
DATED : December 3, 1996
INVENTOR(S) : Donald W. Iwerks; Robert H. Gurr It is certified that error appears in the above-indentified patent and that said Letters Patent is hereby corrected as shown below:

Column 2, line 45, change "lefthand" to -- left-hand --.
Column 4, line 1, change "2,072" to -- 2.072 --.
Column 7, line 32, replace "604" with -- 602 --.
Column 10, line 6, replace "12" with -- 9 --.

Signed and Sealed this

Twenty-sixth Day of August, 1997

Attest:

BRUCE LEHMAN

*Attesting Officer*   *Commissioner of Patents and Trademarks*